(12) United States Patent
Pagliaroli et al.

(10) Patent No.: US 8,657,259 B2
(45) Date of Patent: Feb. 25, 2014

(54) FISH TAPE LEADER

(76) Inventors: James Pagliaroli, Woodbridge (CA); John Belmonte, Woodbridge (CA)

(*) Notice: Subject to any disclaimer, the term of this patent is extended or adjusted under 35 U.S.C. 154(b) by 459 days.

(21) Appl. No.: 12/966,656

(22) Filed: Dec. 13, 2010

(65) Prior Publication Data
US 2011/0140058 A1 Jun. 16, 2011

Related U.S. Application Data

(60) Provisional application No. 61/286,144, filed on Dec. 14, 2009.

(51) Int. Cl.
*H02G 1/08* (2006.01)

(52) U.S. Cl.
USPC ............ 254/134.3 FT; 254/134.3 R

(58) Field of Classification Search
USPC ................................ 254/134.3 FT
See application file for complete search history.

(56) References Cited

U.S. PATENT DOCUMENTS

| | | | | |
|---|---|---|---|---|
| 5,395,091 A | * | 3/1995 | Craddock | 254/134.3 FT |
| 5,938,180 A | * | 8/1999 | Walsten | 254/134.3 FT |
| 7,216,846 B2 | * | 5/2007 | Crawford | 254/134.3 FT |
| 8,186,034 B2 | * | 5/2012 | Vitito | 29/433 |
| 2004/0041136 A1 | * | 3/2004 | Ames et al. | 254/134.3 FT |
| 2005/0242331 A1 | * | 11/2005 | Ames et al. | 254/134.3 FT |
| 2007/0001157 A1 | | 1/2007 | Quick | |
| 2011/0140058 A1 | * | 6/2011 | Pagliaroli et al. | 254/134.3 FT |

OTHER PUBLICATIONS

13" Flexible Fish Tape Leader, http://www.service.kleintools.com/Tools/PRD/Category//Product/50350, the image of the device shown is believed to have been published online as early as Oct. 2, 2009.
Steel Fish Tape Swivel Eyelet, http://www.service.kleintools.com/Tools/PRD/Category//Product/50351, the image of the device shown is believed to have been published online as early as Oct. 2, 2009.
Ideal 31-148 Fish Tape Leader, http://www.toolup.com/ideal_31-148_fish-tape-leader.aspx, the image of the device shown is believed to have been published online as early as Oct. 2, 2009.
Ideal 31-158 S-Class Fiberglass Fish Tape Replacement Eyelets, http://www.toolup.com/ideal_31-158_s-class-fiberglass-fish-tape-replacement-eyelets.aspx, the image of the device shown is believed to have been published online as early as Oct. 2, 2009.

* cited by examiner

Primary Examiner — Lee D Wilson
(74) Attorney, Agent, or Firm — Bereskin & Parr LLP/S.E.N.C.R.L., s.r.l.

(57) ABSTRACT

A fish tape leader comprises a leader body extending along a longitudinal axis between a first end and a second end. A spheroid cap is at the first end. A tail portion extends from the spheroid cap to the second end. An eyelet extends through the leader body transverse to the longitudinal axis. The fish tape leader further comprises an attachment portion configured to secure the leader body to a fish tape.

18 Claims, 9 Drawing Sheets

FISH TAPE LEADER

FIELD

The specification relates to fish tape leaders. Specifically, the specification relates to leaders which may be attached to a fish tape, and which may be used to fish a wire or cable through a conduit.

INTRODUCTION

The following is not an admission that anything discussed below is prior art or part of the common general knowledge of persons skilled in the art.

Fish tape may be used to run electrical or other cables or wires through conduits. Fish tapes may be made from a length of flat steel. A fish tape leader may be attached to an end of the fish tape. The fish tape leader serves as a head for the fish tape, and allows the cable or wire to be attached thereto. In use, the fish tape, with the fish tape leader attached thereto, is fed through the first end of a conduit by pushing the fish tape, and towards a second end, where it exits the conduit. The user then attaches the wire or cable to the fish tape leader, and then pulls the fish tape back through the conduit from the second end to the first end, to run the wire or cable through the conduit.

Fish tape may be crimped on to a fish tape leader, which requires the fish tape leader to be comprised of 2 pieces that can be readily disassembled and reassembled. Fish tape leaders comprised of 2 pieces, wherein one piece is threadably receivable in the other piece to allow fish tape to be crimped on, may inadvertently separate inside a conduit if under-tightened, or alternatively, may become difficult to separate if over-tightened.

The conduit is often a pipe that contains the wire or cable, for example, behind a wall or in a floor or ceiling. The conduit is often bent, for example, bent back on itself 90 degrees or more, which increases the risk that the fish tape leader will get caught in the conduit. The user can pull back the fish tape and push again but this is tiring and difficult in a long run of pipe. Steel fish tapes lack flexibility to effectively bend around all shapes and barriers when used with current fish tape leaders. As a result, nylon has been used more commonly as a fish tape for very flexible conduits such as corrugated conduits that often bend 90 degrees or more. However, nylon fish tape attached to a leader lacking a spheroid cap will often become trapped when sent around bends of 90 degrees or more. In addition, nylon is not as durable as steel and it is not useful to pull wires or cables. Nylon is typically used in a cumbersome process that pushes nylon fish tape, then pulls a string, such as twine, then pulls wire or cable with the string.

SUMMARY

The following summary is provided to introduce the reader to the more detailed discussion to follow. The summary is not intended to limit or define the claims.

According to one aspect, a fish tape leader is provided. The fish tape leader comprises a leader body extending along a longitudinal axis between a first end and a second end. A spheroid cap is at the first end. A tail portion extends from the spheroid cap to the second end. An eyelet extends through the leader body transverse to the longitudinal axis. The fish tape leader further comprises an attachment portion configured to secure the leader body to a fish tape.

The spheroid cap may comprise a base and a deflection surface. A perimeter of the base may be at least 2 cm. The deflection surface may have a surface area of at least 0.5 cm$^2$.

The spheroid cap may have a length parallel to the longitudinal axis. The length may be at least 0.25 cm.

The tail portion may have a tail portion proximal end and a longitudinally opposed tail portion distal end. The spheroid cap may have a spheroid cap proximal end adjoining the tail portion distal end, and a longitudinally opposed spheroid cap distal end. The eyelet portion may be in the tail portion and proximate to the tail portion distal end. The eyelet may be at the tail portion distal end.

The spheroid cap proximal end may have a spheroid cap proximal end profile that circular, elliptical, or ovoid. The tail portion distal end may have a tail portion distal end profile that is substantially the same as the cap proximal end profile.

The tail portion may comprise an eyelet portion adjacent the spheroid cap and through which the eyelet extends, a central portion adjacent the eyelet portion, and an end portion at the second end. The central portion may be generally frustoconical, and may define a central portion taper angle with respect to the longitudinal axis. The end portion may comprise a cylindrical portion adjacent the central portion, and a tapered portion adjacent the cylindrical portion. The taper portion may be generally frustoconical and may define a taper portion taper angle with respect to the longitudinal axis. The taper portion taper angle may be greater than the central portion taper angle.

The eyelet may extend through the leader body along an eyelet axis transverse to the longitudinal axis. When the leader body is viewed along the eyelet axis, the leader body may comprise a rounded end and opposed first and second generally straight sides extending from the rounded end and angled inwardly towards the longitudinal axis. The generally straight sides may extend tangentially from the rounded end. When the leader body is viewed from a direction transverse to the eyelet axis and the longitudinal axis, the leader body may comprise a rounded end, and opposed first and second sides extending from the rounded end. The first and second sides may each comprise a divot portion extending from the rounded end, and a generally straight portion extending from the divot portion and angled inwardly towards the longitudinal axis.

The attachment portion may comprise a fish-tape receiving slot extending from the second end along the longitudinal axis into the leader body. The fish tape leader may further comprise at least a first fastener configured to releasably bear against a fish tape received in the fish-tape receiving slot to removably secure the fish tape to the leader body.

The leader body may further comprise at least a first aperture extending transversely to the longitudinal axis between an outer surface of the tail portion and the slot. The first fastener may be removably securable in the first aperture.

The spheroid cap may have a base at the proximal end and a deflection surface extending from the base. The deflections surface may define a distal deflection surface of the leader body. The tail may have an outer surface defining a proximal deflection surface of the leader body. The entirety of the proximal deflection surface may be parallel to or at an oblique angle relative to the longitudinal axis.

According to another aspect, a fish tape leader is provided. The fish tape leader comprises a one-piece leader body. The leader body extends along a longitudinal axis between a first end and a second end and comprises an eyelet extending through the leader body transverse to the longitudinal axis. A fish-tape receiving slot extends from the second end along the longitudinal axis into the leader body. The fish tape leader further comprises a first fastener configured to releasably bear against a fish tape received in the fish-tape receiving slot to removably secure the fish tape to the leader body.

The leader body may comprise at least a first aperture extending transversely to the longitudinal axis between an outer surface of the leader body and the slot, and the first fastener may be removably securable in the first aperture. The first aperture may comprise an inner threaded wall, and the first fastener may comprise a screw. When the screw is screwed into the first aperture, an end of the screw may bear against the fish tape. The screw may be a set screw.

The leader body may further comprise a second aperture extending transversely to the longitudinal axis between an outer surface of the tail portion and the slot and on a laterally opposed side of the slot. The fish tape leader may further comprise a second fastener removably securable in the second aperture and configured to bear against the fish tape received in the fish-tape receiving slot to removably secure the fish tape to the leader body.

The first aperture and second aperture may be non-collinear, and may be spaced apart along the longitudinal axis.

The fish tape receiving slot may be one of rectangular and circular in transverse section.

The leader body may comprise a leader body length defined between the first end and the second end, and the fish tape receiving slot may comprise a slot length that is at least 50% of the leader body length.

DRAWINGS

Reference is made in the description to the appended drawings, in which.

DESCRIPTION

Various apparatuses or methods will be described below to provide an example of each claimed invention. No example described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention.

Figure 1:
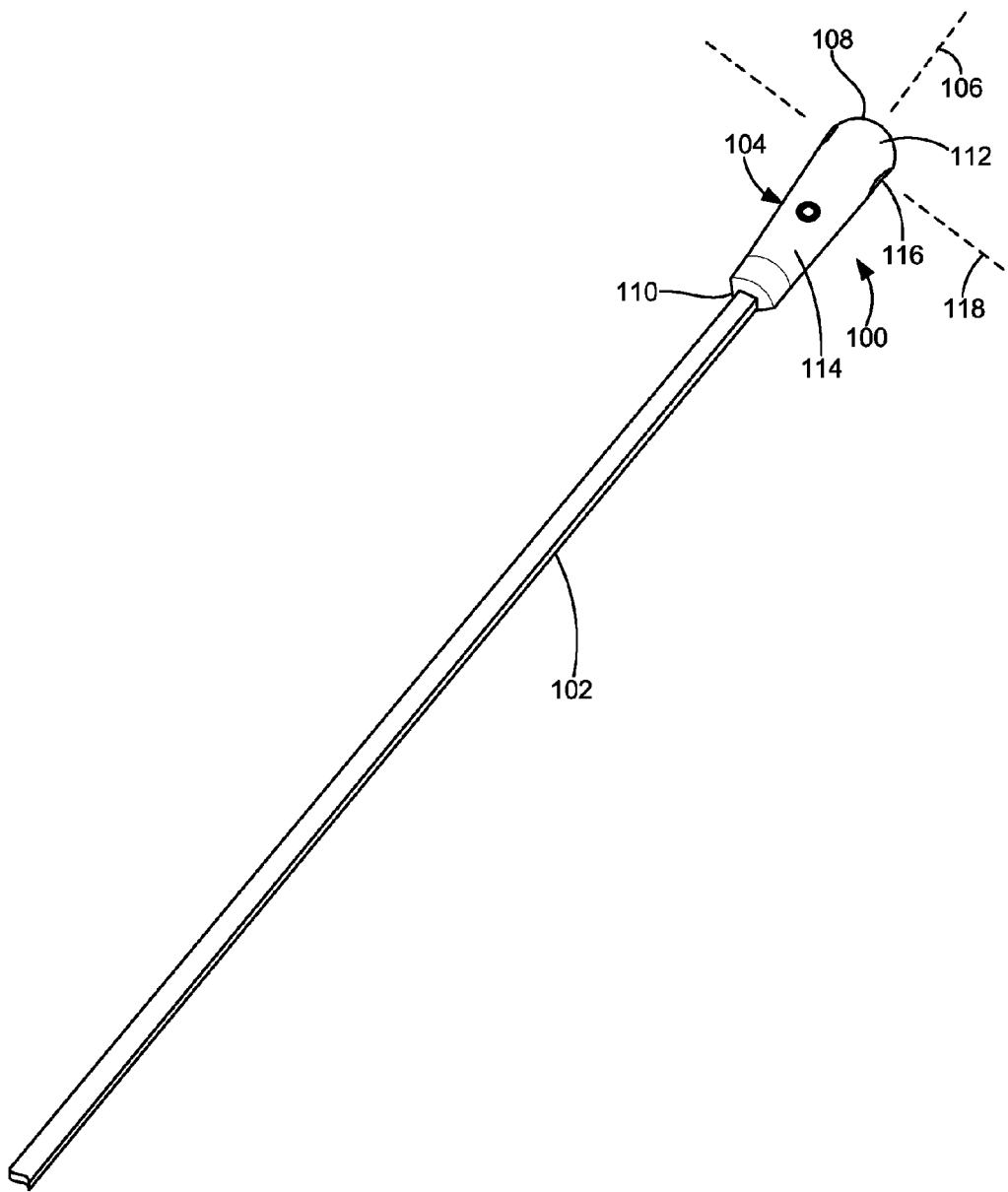
FIG. 1 is a perspective illustration of an example of a fish tape leader secured to a fish tape.

Referring to FIG. 1, an example of a fish tape leader 100 is shown. The fish tape leader 100 is securable to a fish tape 102, and may be used to lead the fish tape 102 through a conduit (not shown). A wire or cable may then be attached to the fish tape leader 100, and the fish tape may then be pulled back through the conduit, to run the wire or cable through the conduit. In another example, string may then be attached to the fish tape leader 100, and the fish tape 102, optionally nylon fish tape, may then be pulled back through the conduit, to run the string through the conduit. The string is then released from the fish tape leader 100 and a wire or cable may then be attached to the string. The string may then be pulled back through the conduit to run the wire or cable through the conduit. Alternately, the fish tape leader 100 may be used to lead the fish tape 102 between a wall and a vapor barrier. A wire or cable may then be attached to the fish tape leader 100, and the fish tape may then be pulled back between the wall and the vapor barrier, to run the wire or cable through between the wall and the vapor barrier.

Referring still to FIG. 1, the fish tape leader 100 comprises a one-piece leader body 104, which extends along a longitudinal axis 106, between a first end 108, and a second end 110. The first end 108 is spaced from the fish tape 102, and may also be referred to as a distal end of the leader body 104; the second end 110 is towards the fish tape 102, and may also be referred to as a proximal end of the leader body.

Referring still to FIG. 1, the fish tape leader 100 comprises a spheroid cap 112 at the first end, and a tail portion 114 extending from the spheroid cap 112 along the longitudinal axis 106 to the second end 110. The fish tape leader 100 further includes an eyelet 116 to which a wire, cable or string may be attached. The eyelet 116 extends through the leader body 104 transverse to the longitudinal axis 106 along an eyelet axis 118. The fish tape leader 100 further comprises an attachment portion 120 (shown in FIG. 9) configured to secure the leader body 104 to the fish tape 102, as will be described in further detail hereinbelow.

The fish tape leader 100 is useful to lead the fish tape 102 through different types of conduits, for example, corrugated line, electrical metallic tubing, liquid tight flex conduits and polyvinyl chloride conduits. In some examples, the conduit is bent or curved. The fish tape 102 is, for example, steel fish tape or nylon fish tape and may be of any suitable shape or diameter.

Figure 2:
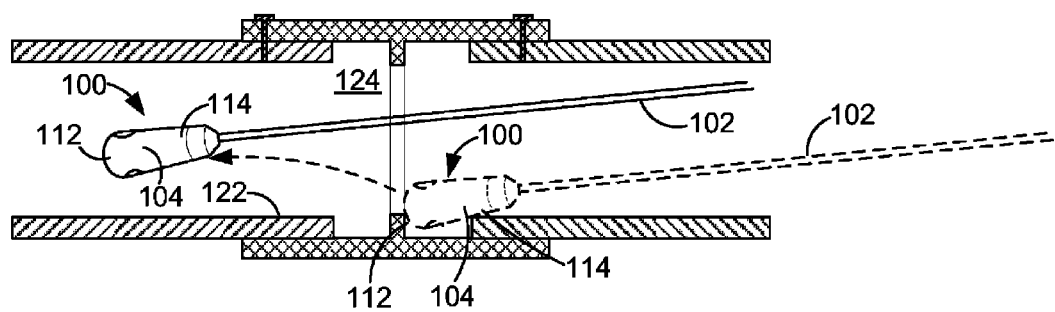
FIG. 2 is a schematic illustration of a the fish tape leader of FIG. 1 being pushed through a conduit, hitting an obstruction, and deflecting away from the obstruction.

In some examples, when feeding the fish tape 102 through a conduit, the spheroid cap 112 may generally serve to deflect the leader body 104 away from an obstruction in the conduit, for example, obstructions inherent in a corrugated conduit, to prevent or reduce the risk of the leader body 104 from becoming trapped behind the obstruction, and to prevent or limit any damage to the leader body 104 that may be sustained from using the leader body 104 to run wire or cable through a conduit. Particularly, referring to FIG. 2, if the leader body 104 comes into contact with an obstruction 122 in the conduit 124, such as an obstruction caused by a joint, the spheroid cap 112 may serve to deflect the leader body 104 away from the obstruction 122, such that it may proceed through the conduit 124.

In some further examples, when feeding the fish tape 102 through a conduit, the spheroid cap 112 may generally serve to deflect the leader body 104 around bends or curves in the conduit and to prevent or reduce the risk of the leader body 104 from becoming trapped by bends or curves in the conduit.

Figure 3:
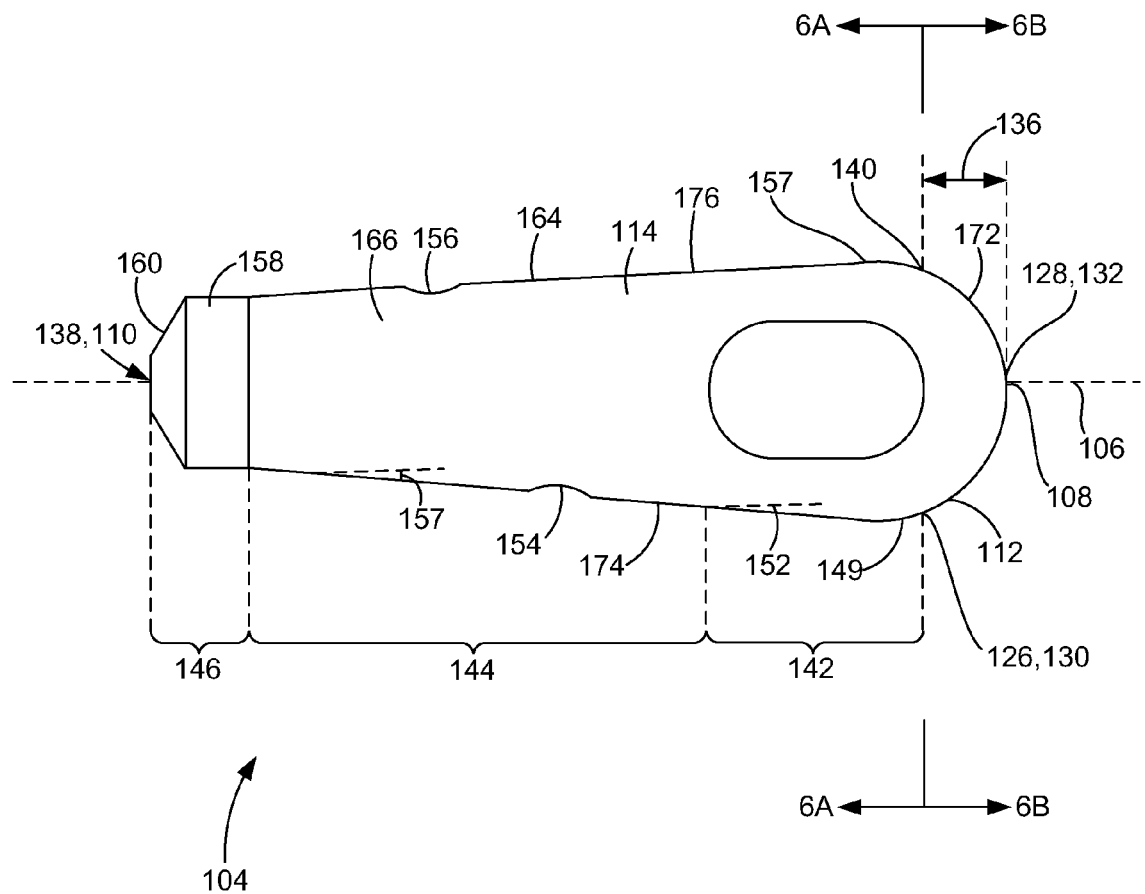
FIG. 3 is a front plan view of the leader body of the fish tape leader of FIG. 1.
Figure 4:
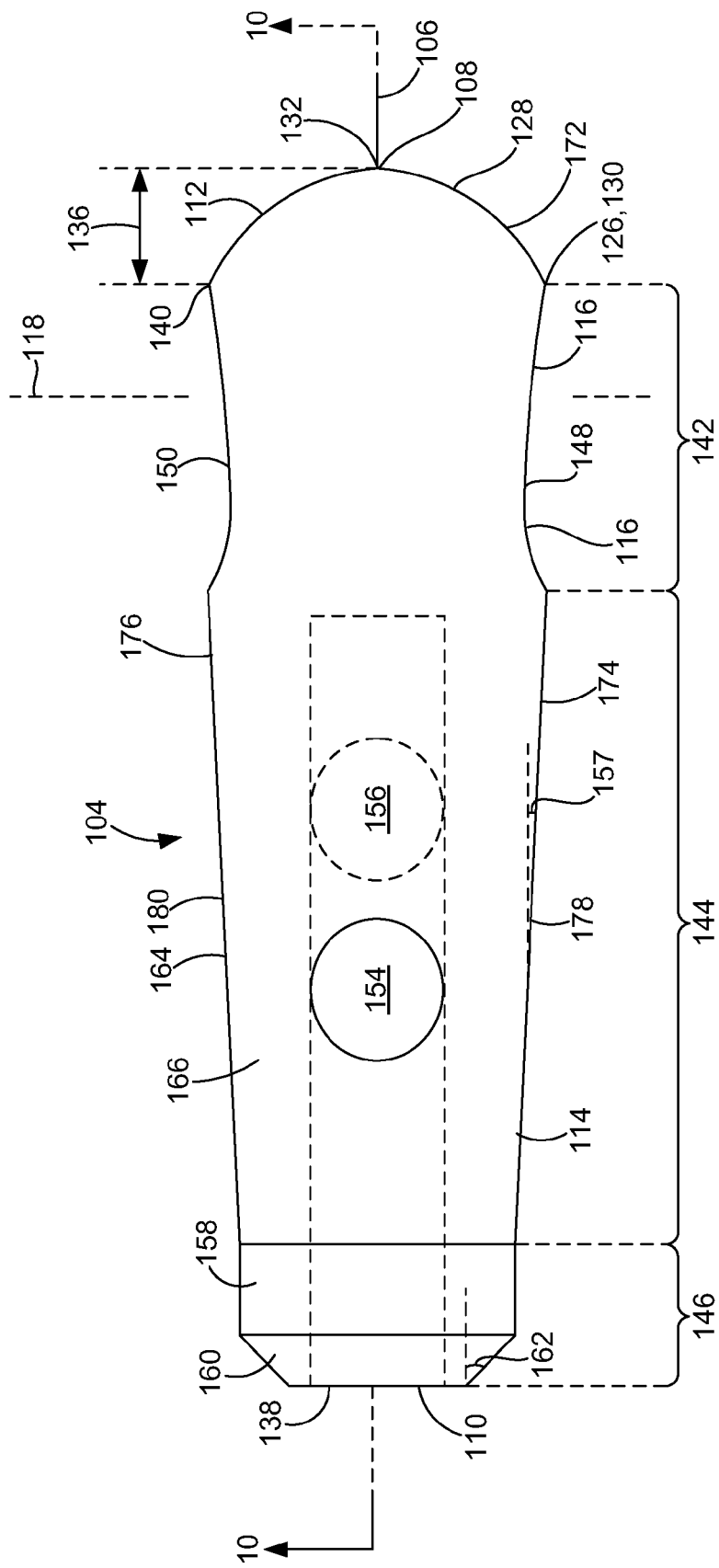
FIG. 4 is a side plan view of the leader body of the fish tape leader of FIG. 1.
Figure 5:
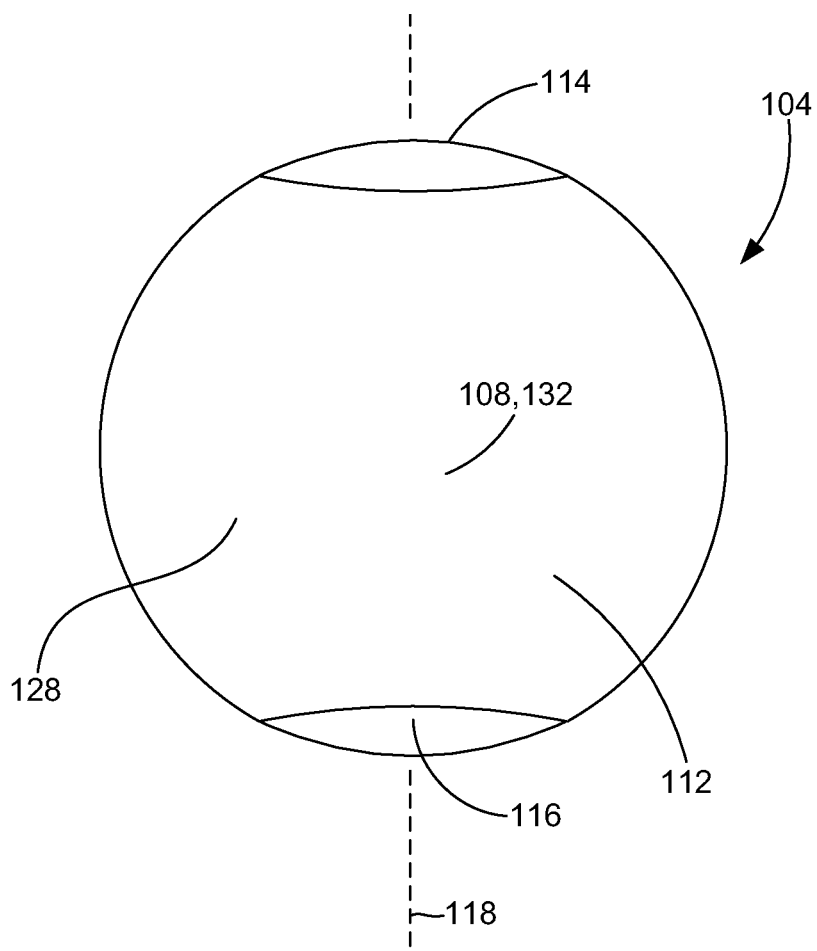
FIG. 5 is a top plan view of the leader body of the fish tape leader of FIG. 1.

Referring to FIGS. 3 to 5, the spheroid cap 112 comprises a base 126, which is adjoined to the tail portion 114, and a deflection surface 128, which extends from the base 126 and faces away from the tail portion 114. The base 126 defines a proximal end 130 of the spheroid cap 112, and the deflection surface 128 defines a longitudinally opposed distal end 132 of the spheroid cap 112. When being pushed through a conduit, the deflection surface 128 defines a lead deflection surface of the leader body 104.

Figure 8:
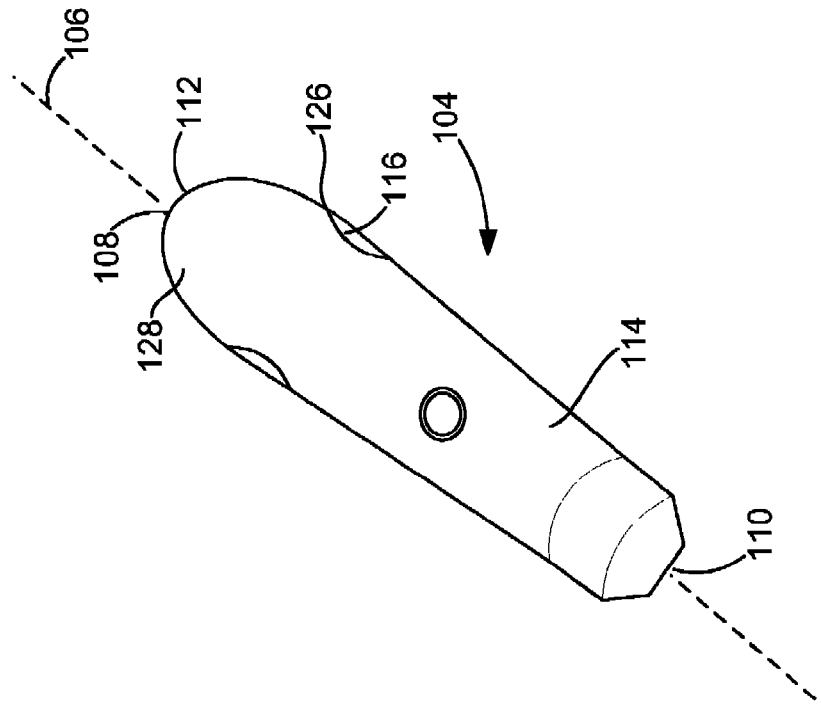
FIG. 8 is a perspective illustration of another alternate example of a leader body.
Figure 7:
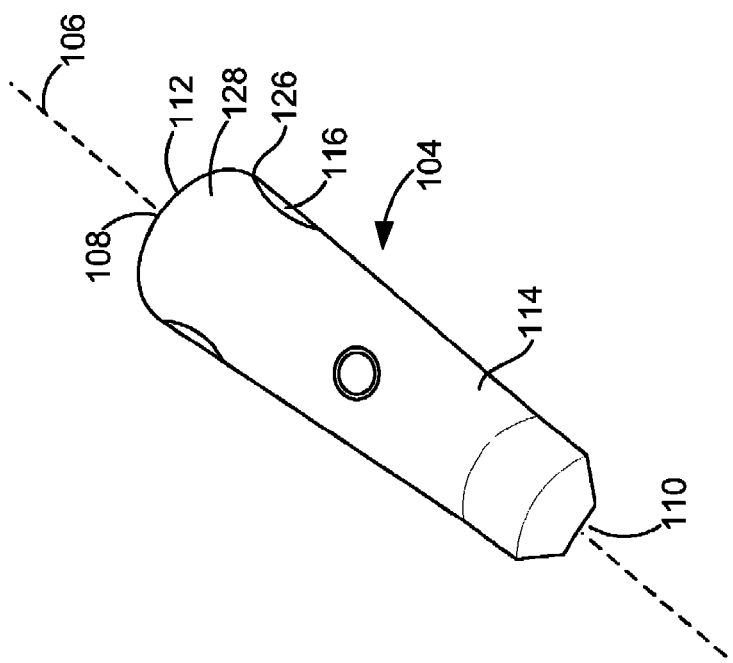
FIG. 7 is a perspective illustration of an alternate example of a leader body.

The spheroid cap 112 may generally include any shape in which the deflection surface 128 comprises a three-dimensional convex surface. For example, the spheroid cap 112 may generally include any portion of a spheroid object, including a sphere, an oblate spheroid, and a prolate spheroid. For example, as shown in FIG. 1-5, the spheroid cap 112 may include a portion of a sphere, cut off by a plane. The portion of the sphere may be a hemisphere, or a segment of a sphere, as shown. Alternately, as shown in FIG. 7, the spheroid cap 112 may include a portion of an oblate spheroid, cut off by a plane. Alternately, as shown in FIG. 8, the spheroid cap 112 may include a portion of a prolate spheroid, cut off by a plane. In yet further alternate examples, the spheroid cap may include other shapes, such as generally bell-shaped.

In some examples, depending on the particular configuration of spheroid cap 112, when feeding the fish tape 102 between a wall and a vapor barrier, the spheroid cap 112 may generally serve to prevent the fish tape leader 100 from penetrating the vapor barrier, or minimize or reduce the risk of the fish tape leader 100 penetrating the vapor barrier. Particularly, in examples wherein the spheroid cap is generally more blunt, such as the example shown in FIG. 7, the risk of penetrating the vapor barrier may be reduced.

The spherical cap 112 may be symmetrical about the longitudinal axis 106, as shown in FIGS. 1-5, 7, and 8, or may alternately be asymmetrical about the longitudinal axis 106 (not shown). The plane which cuts of the spheroid object may be perpendicular to the longitudinal axis 106, as shown in FIGS. 1-5, 8, and 9, or may alternately be at an oblique angle to the longitudinal axis 106.

Figure 6A:
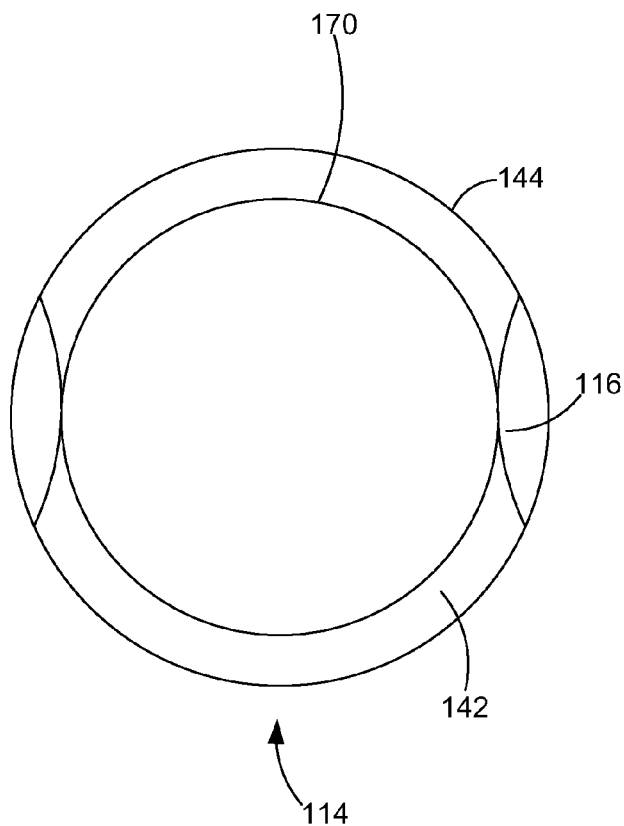
FIG. 6A is a cross section taken along line 6A-6A in FIG. 3.
Figure 6B:
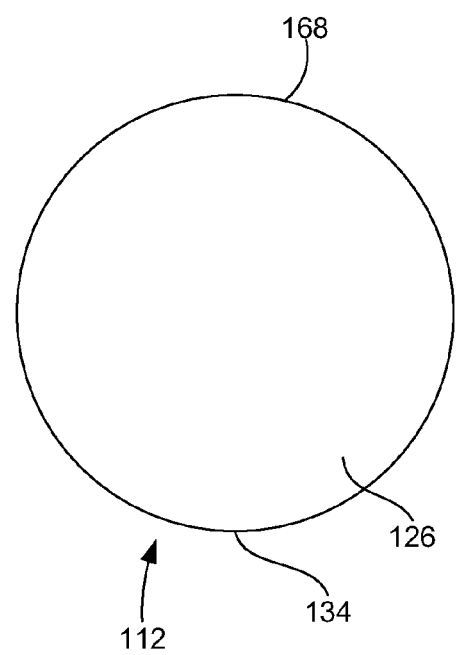
FIG. 6B is a cross section taken along line 6B-6B in FIG. 4.

The spheroid cap 112 may be of any suitable size. In some examples, the perimeter 134 (shown in FIG. 6B) of the base 126 is at least 2 cm, the length 136 (shown in FIGS. 3 and 4) of the spheroid cap 112 (i.e. parallel to the longitudinal axis 106) is at least 0.25 cm, and the surface area of the deflection surface 128 is at least 0.5 cm$^2$. Such dimensions are suitable for deflecting the leader body 104 away from typical obstructions found in a typical conduit. However, the spheroid cap 112 may have alternate dimensions. In one particular example, the perimeter 134 of the base 126 is about 3 cm, the length 136 of the spheroid cap 112 (i.e. parallel to the longitudinal axis 106) is about 0.5 cm, and the surface area of the deflection surface 128 is about 1.5 cm$^2$.

Referring still to FIGS. 3 and 4, the tail portion 114 extends from the base 126 of the spheroid cap 112 to the second end 110. The tail portion 114 has a tail portion proximal end 138, towards the fish tape 102, and a longitudinally opposed tail portion distal end 140. The proximal end 130 of the spheroid cap 112 is adjoined to the distal end 140 of the tail portion 114.

As shown, the tail portion 114 includes three portions: an eyelet portion 142 through which the eyelet 116 is defined; a central portion 144; and an end portion 146.

Referring still to FIGS. 3 and 4, as shown, the eyelet portion 142 is at the tail portion distal end 140 and adjacent the spheroid cap 112, and the eyelet 116 is at the tail portion distal end 134. In alternate examples, the eyelet portion 142 and/or the eyelet 116 may be positioned elsewhere in the tail portion 114. For example, the eyelet portion 142 may be at the tail portion distal end 140 and adjacent the spheroid cap 112, and the eyelet 116 may be proximate to but spaced slightly from the tail portion distal end 140. In another example, the eyelet portion 142 may be adjacent the tail portion proximal end 138, and the eyelet 116 may be proximate to the tail portion proximal end 138. In yet further alternate examples, the eyelet portion 142 may be at the tail portion distal end 140 and adjacent the spheroid cap 112, and a portion of the eyelet 116 may be within the spherical cap 112. In a further alternate example, the tail portion 114 may not comprise an eyelet portion 142, and the eyelet 116 may be entirely within the spheroid cap 112.

As shown, the eyelet portion 142 is generally frustoconical, excluding (a) divot portions 148, 150, corresponding to the eyelet 116, that are seen when the leader body 104 is viewed in a direction transverse to the eyelet axis 118 and the longitudinal axis 106 (as shown in FIG. 4); and (b) curved portions 149, 151 at the tail portion distal end 140 that are seen when the leader body 104 is viewed in a direction parallel to the eyelet axis 118 (as shown in FIG. 3). The curved portions 149, 151 are provided so that the tail portion 114 extends generally smoothly from the spheroid cap 112, as will be described further hereinbelow. In alternate examples, the curved portions 149, 151 may not be provided.

The eyelet portion 142 defines an eyelet portion taper angle 152 with respect to the longitudinal axis 106. In some examples, the eyelet portion taper angle 152 may be between 1 degrees and 45 degrees. As shown, the eyelet portion taper angle 152 is about 10 degrees.

Referring still to FIGS. 3 and 4, the central portion 144 is adjacent the eyelet portion 146. The central portion 144 is generally frustoconical, excluding apertures (or screw holes) 154, 156 that are seen when the leader body 104 is viewed in a direction parallel to the eyelet axis 118 and perpendicular to the longitudinal axis 106, as shown in FIG. 3. The central portion 144 defines a central portion taper angle 157 with respect to the longitudinal axis 106. As exemplified, the central portion taper angle 157 is the same as the eyelet portion taper angle 152, so that the central portion 144 extends smoothly from the eyelet portion 142.

Referring still to FIGS. 3 and 4, the end portion 146 is adjacent the central portion 144, and is at the second end 110 of the leader body 104. As shown, the end portion 146 comprises a cylindrical portion 158 adjacent the central portion 144, and a tapered portion 160 adjacent the cylindrical portion 158. The tapered portion 160 is generally frustoconical, and defines a tapered portion taper angle 162 with respect to the longitudinal axis 106. As shown, the taper portion taper angle 162 is greater than the central portion taper angle 157 and eyelet portion taper angle 152. In alternate examples, the taper portion taper angle 162 may be the same as or less than the central portion taper angle 157 and the eyelet portion taper angle 152.

As shown, the tapered portion 160 tapers until it meets the fish tape 102. When the fish tape leader 100 is pulled backwards through a conduit, the tapered portion 160 may deflect the leader body 104 away from an obstruction in the conduit.

In alternate examples, the tail portion 114 may not comprise a distinct end portion 146. For example, the central portion 144 may taper until it meets the fish tape 102.

Referring still to FIGS. 3 and 4, as shown, the entirety of the outer surface 164 of the tail portion 114 is parallel to or at an oblique angle to the longitudinal axis 106. That is, the tail portion 114 is generally free of surfaces that extend perpendicular to the longitudinal axis 106. Accordingly, the tail portion 114 is generally free of surfaces that may get caught on an obstruction in a conduit when the leader body 104 is either being pushed or pulled through the conduit. Accordingly, outer surface 164 of the tail portion 114 defines a proximal deflection surface 166 of the leader body 104.

As shown, the tail portion 114 extends generally smoothly from the spheroid cap 112. Specifically, referring to FIGS. 6A and 6B, the proximal end 130 of the spheroid cap 112 has a spheroid cap proximal end profile 168 (i.e. the cross-sectional shape and size transverse to the longitudinal axis 106), and the distal end 138 of the tail portion 114 has a tail portion distal end profile 170 that is substantially the same as the spheroid cap proximal end profile 168. For example, as shown, the spheroid cap proximal end profile 168 is circular and has a perimeter of about 3 cm, and the tail portion distal end profile 172 is circular and has a perimeter of about 3 cm. In alternate examples, both the spheroid cap proximal end profile 168 and the tail portion distal end profile 170 may be another shape, such as ovoid or elliptical.

Further, when the leader body 104 is viewed along the eyelet axis 118, as shown in FIG. 3, the leader body 104 comprises a rounded end 172, and opposed first and second sides 174, 176 extending tangentially from the rounded end 172. The first and second sides 174, 176, are generally straight and angled inwardly towards the longitudinal axis 106. When the leader body 104 is viewed in a direction perpendicular to both the longitudinal axis 106 and the eyelet axis 118, as shown in FIG. 4, the leader body 104 comprises the rounded end 172, and the opposed first and second sides 174, 176 extending from the rounded end 172. The first and second sides each comprise the divot portions 148, 150 mentioned hereinabove, which correspond the eyelet 116 and which extend from the rounded portion 172, and generally straight portions 178, 180 extending form the divot portions 148, 150 and angled inwardly towards the longitudinal axis 106.

Such examples, wherein the tail portion 114 extends generally smoothly from the spheroid cap 112, may further prevent or inhibit the leader body 104 from becoming blocked by an obstruction in a conduit and may further prevent or limit any damage to the leader body 104 that may be sustained from using the leader body 104 to run wire or cable through a conduit.

Figure 9:
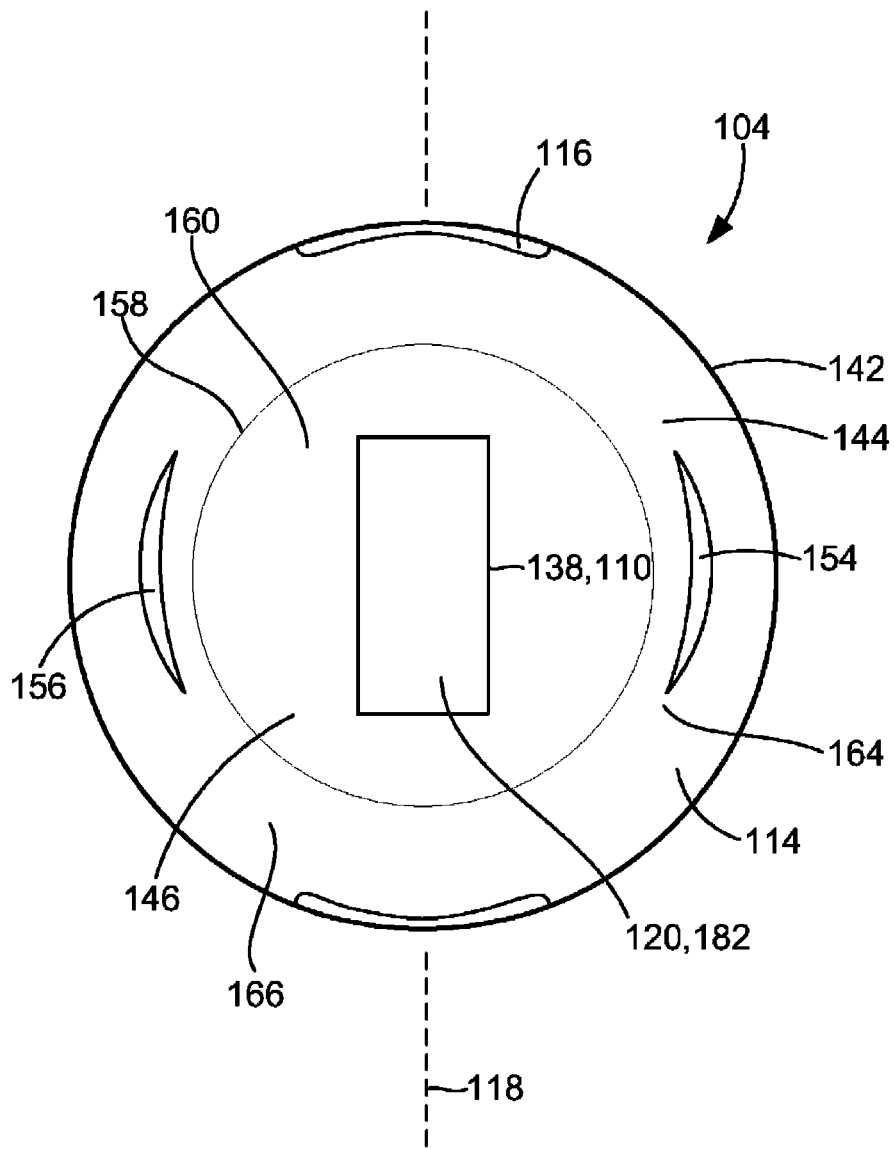
FIG. 9 is a bottom plan view of the leader body of the fish tape leader of FIG. 1.
Figure 10:
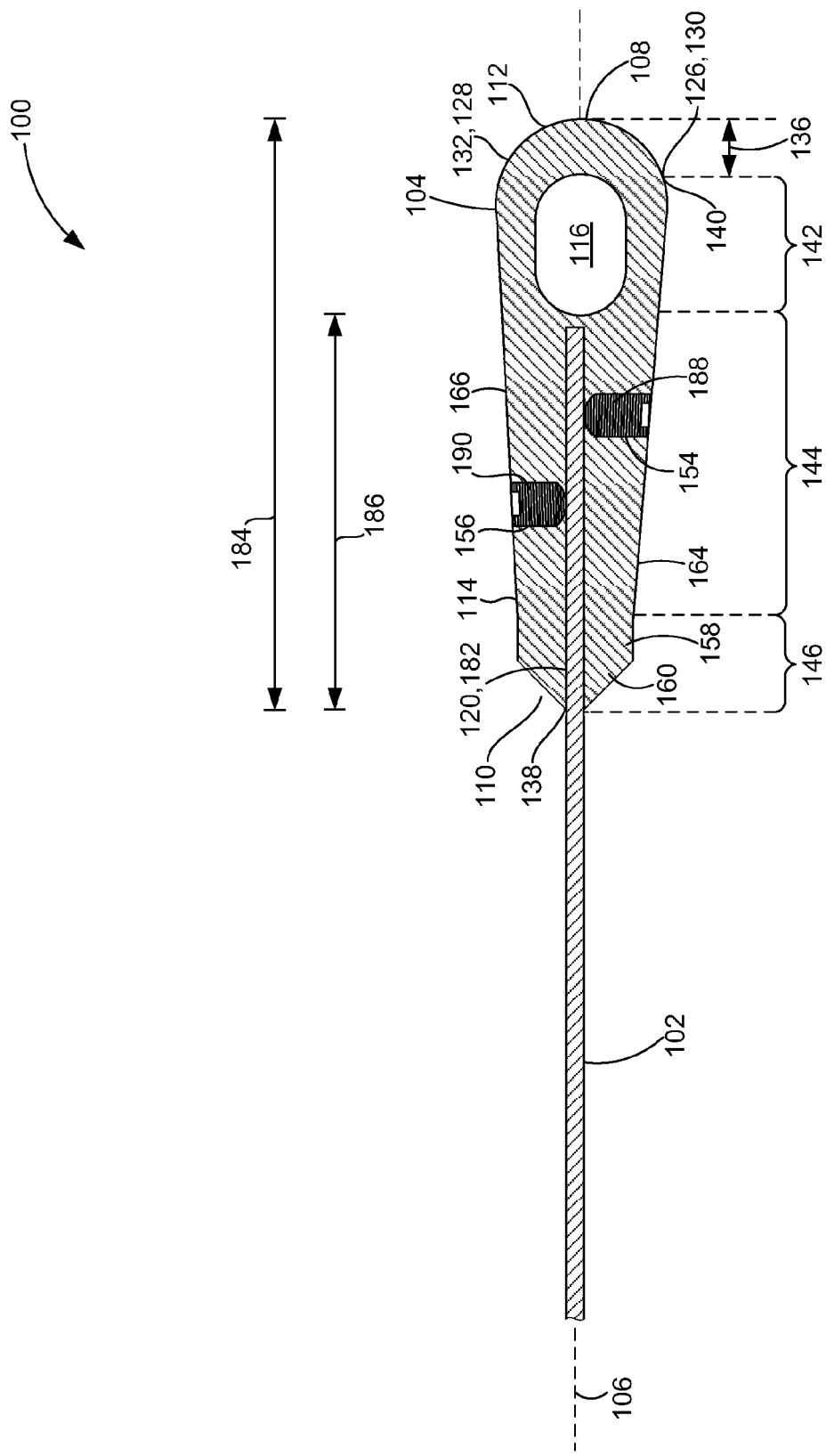
FIG. 10 is a cross-section taken along line 10-10 in FIG. 4.

As mentioned hereinabove, the leader body further comprises an attachment portion 118 configured to secure the leader body 104 to a fish tape 102. As exemplified, the attachment portion 118 is configured to removably secure the leader body 104 to a fish tape 102 without crimping the fish tape 102. Hence, the requirement of a crimping tool is avoided. Referring to FIGS. 9 and 10, as shown, the attachment portion 120 comprises a fish-tape receiving slot 182 extending from the second end 110 of the leader body 104 along the axis 106 and into the leader body 104. A fish tape 102 may be inserted into the fish tape receiving slot 182, and may be secured therein by one or more fasteners, as will be described further hereinbelow.

Referring still to FIGS. 9 and 10, as exemplified, the fish tape 102 is generally rectangular in transverse section, and the fish tape receiving slot 182 is also generally rectangular in transverse section, and is sized to snugly receive the fish tape 102. In alternate examples, the fish tape receiving slot 182 may have a shape and size that is different from that of the fish tape. For example, the fish tape receiving slot 182 may be generally circular.

Referring to FIG. 10, the leader body 104 has a leader body length 184 defined between the first end 108 and the second end 110 thereof. The fish tape receiving slot 182 may have a slot length 186 that is at least 50% of the leader body length 184. In one particular example, the leader body length 184 is about 1.2 inches, and the slot length is about 0.75 inches. As shown, the fish tape receiving slot 182 extends from the second end 110, through the end portion 146 and the central portion 144, to the eyelet portion 142.

As mentioned hereinabove, the fish tape 102 may be releasably secured in the fish tape receiving slot 182 by one or more fasteners. As exemplified, the fish tape leader further comprises a first 188 and a second 190 fastener configured to releasably bear against the fish tape 102 to removably secure the fish tape 102 to the leader body 104.

Referring still to FIG. 10, the leader body 104 comprises a first aperture 154 extending transversely to the longitudinal axis 106, between the outer surface 164 of tail portion 114 and the slot 182. The leader body 104 further comprises a second aperture 156 extending transversely to the longitudinal axis 106, between the outer surface 164 of the tail portion 114 and the slot 182. The first 154 and second 156 apertures are on laterally opposed sides of the slot 182, and are spaced apart along the longitudinal axis 106 so that they are non-collinear. The first 192 and second 194 apertures each comprise an inner threaded wall.

The first fastener 188 comprises a first screw, which is threadably receivable in the first aperture 154, and the second fastener 190 comprises a second screw, which is threadably receivable in the second aperture 156. As exemplified, the first and second screws are set screws. In alternate examples, the first and second screws may be another type of screw. When the screws are received in the first and second apertures 154, 156, the ends of the screws bear against the fish tape 102, to secure the fish tape 102 in the fish tape receiving slot 182.

As exemplified, the first and second apertures 154, 156 are defined in the central portion 144 of the tail portion 114. In alternate examples, the first and second apertures 154, 156 may be defined in another portion of the leader body 104, such as the end portion 146 of the tail portion 114. Further, as exemplified, the apertures 154, 156 extend perpendicular to the eyelet axis 118. In alternate examples, the apertures 154, 156 may extend parallel to or at an oblique angle to the eyelet axis 118. Further, as exemplified, the apertures 154, 156 extend perpendicular to the longitudinal axis 106. In alternate examples, the apertures 154, 156 may extend at an oblique angle to the longitudinal axis 106.

In the example shown, the first and second fasteners 188, 190 are screws. In alternate examples, the first and second fasteners 188, 190 may be another type of fastener, such as a pin or a clamp. In such alternate examples, the leader body 104 may or may not comprise apertures 154, 156 in which the fasteners 188, 190 are received. Further, in alternate examples, the fish tape leader 100 may comprise only one fastener, or more than one fastener.

As mentioned hereinabove, as exemplified, the leader body 104 is a one piece unit. The leader body 104 may be machined from stainless steel, for example. A one-piece leader body avoids the problems of inadvertent separation encountered with some two-piece leader body designs.

In use, the fish tape 102 may be inserted into the fish tape receiving slot 182 of the leader body 104, and the first and second screws may be screwed into the first and second apertures 154, 156 until the first and second screws bear against the fish tape 102. The fish tape leader 100 may then be fed through the first end of a conduit by pushing the fish tape 102, and towards a second end of the conduit, where it exits the conduit. A wire, cable, or string may then be attached to the leader body 104 by securing the wire, cable, or string to the eyelet 116. The fish tape 102 may then be pulled back through the conduit from the second end to the first end, to run the wire, cable, or string through the conduit. When using string, the string may then be released from the fish tape leader 100 and a wire or cable may then be secured to the string, for example, with tape, or by tying a knot. The string may then be pulled back through the conduit to run the wire or cable through the conduit. Where the fish tape 102 is nylon fish tape and a wire or cable is run through a conduit using string as described above, the wire or cable may be run through a conduit, in particular, a corrugated conduit, possessing a bend or curve greater than 90 degrees.

We claim:

1. A fish tape leader comprising:
   a) a leader body extending along a longitudinal axis between a first end and a second end;
   b) a spheroid cap at the first end;
   c) a tail portion extending from the spheroid cap to the second end, the tail portion including a generally frustoconical eyelet portion;
   d) an eyelet extending through the eyelet portion transverse to the longitudinal axis; and
   e) an attachment portion configured to secure the leader body to a fish tape.

2. The fish tape leader of claim 1, wherein the spheroid cap comprises a base and a deflection surface, wherein a perimeter of the base is at least 2 cm.

3. The fish tape leader of claim 1, wherein the spheroid cap has a length parallel to the longitudinal axis, and the length is at least 0.25 cm.

4. The fish tape leader of claim 1, wherein the spheroid cap comprises a base and a deflection surface, and the deflection surface has a surface area of at least 0.5 cm².

5. The fish tape leader of claim 1, wherein:
   a) the tail portion has a tail portion proximal end and a longitudinally opposed tail portion distal end;
   b) the spheroid cap has a spheroid cap proximal end adjoining the tail portion distal end, and a longitudinally opposed spheroid cap distal end; and
   c) the eyelet portion is proximate to the tail portion distal end.

6. The fish tape leader of claim 5, wherein the eyelet is at the tail portion distal end.

7. The fish tape leader of claim 5, wherein the spheroid cap proximal end has a spheroid cap proximal end profile that circular, elliptical, or ovoid; and the tail portion distal end has a tail portion distal end profile that is substantially the same as the cap proximal end profile.

8. The fish tape leader of claim 5, wherein the eyelet portion is adjacent the spheroid cap, and the tail portion comprises a central portion adjacent the eyelet portion, and an end portion at the second end.

9. The fish tape leader of claim 8, wherein the central portion is generally frustoconical, and defines a central portion taper angle with respect to the longitudinal axis.

10. The fish tape leader of claim 9, wherein the end portion comprises a cylindrical portion adjacent the central portion, and a tapered portion adjacent the cylindrical portion.

11. The fish tape leader of claim 10, wherein the taper portion is generally frustoconical and defines a taper portion taper angle with respect to the longitudinal axis, and wherein the taper portion taper angle is greater than the central portion taper angle.

12. The fish tape leader of claim 1, wherein the eyelet extends through the eyelet portion along an eyelet axis transverse to the longitudinal axis, and when the leader body is viewed along the eyelet axis, the leader body comprises a rounded end and opposed first and second generally straight sides extending from the rounded end and angled inwardly towards the longitudinal axis.

13. The fish tape leader of claim 12, wherein the generally straight sides extend tangentially from the rounded end.

14. The fish tape leader of claim 1, wherein the eyelet extends through the eyelet portion along an eyelet axis transverse to the longitudinal axis, and when the leader body is viewed from a direction transverse to the eyelet axis and the longitudinal axis, the leader body comprises a rounded end, and opposed first and second sides extending from the rounded end, the first and second sides each comprising a divot portion extending from the rounded end, and a generally straight portion extending from the divot portion and angled inwardly towards the longitudinal axis.

15. The fish tape leader of claim 1, wherein the attachment portion comprises a fish-tape receiving slot extending from the second end along the longitudinal axis into the leader body.

16. The fish tape leader of claim 15, wherein the fish tape leader further comprises at least a first fastener configured to releasably bear against a fish tape received in the fish-tape receiving slot to removably secure the fish tape to the leader body.

17. The fish tape leader of claim 15, wherein the leader body further comprises at least a first aperture extending transversely to the longitudinal axis between an outer surface of the tail portion and the slot, and the first fastener is removably securable in the first aperture.

18. The fish tape leader of claim 5, wherein:
   a) the spheroid cap has a base at the proximal end and a deflection surface extending from the base, the deflections surface defining a distal deflection surface of the leader body; and
   b) the tail has an outer surface defining a proximal deflection surface of the leader body, the entirety of the proximal deflection surface being parallel to or at an oblique angle relative to the longitudinal axis.

* * * * *